(No Model.)

F. RATCLIFF.
COMBINED PEPPER AND SALT BOX AND NAPKIN RING.

No. 279,806. Patented June 19, 1883.

Witnesses.
Louis F. Gardner
J.W. Garner

Inventor.
Fred. Ratcliff
per
F. A. Lehmann, att'y.

N. PETERS, Photo-Lithographer, Washington, D. C.

UNITED STATES PATENT OFFICE.

FREDERICK RATCLIFF, OF NEW BEDFORD, MASSACHUSETTS.

COMBINED PEPPER AND SALT BOX AND NAPKIN-RING.

SPECIFICATION forming part of Letters Patent No. 279,806, dated June 19, 1883.

Application filed May 8, 1883. (No model.)

*To all whom it may concern:*

Be it known that I, FREDERICK RATCLIFF, of New Bedford, in the county of Bristol and State of Massachusetts, have invented certain new and useful Improvements in a Combined Pepper and Salt Box and Napkin-Ring; and I do hereby declare the following to be a full, clear, and exact description of the invention, such as will enable others skilled in the art to which it pertains to make and use it, reference being had to the accompanying drawings, which form part of this specification.

My invention relates to an improvement in combined pepper and salt boxes and napkin-rings; and it consists, first, in combining in a single article of manufacture a salt and pepper receptacle and a napkin ring or holder; second, in forming the article from two duplicate sections, each of which is provided with a receptacle for salt or pepper and a semicircular opening, so that when secured together a combined salt and pepper box and napkin-holder is formed, as will be more fully described hereinafter.

Figure 1:
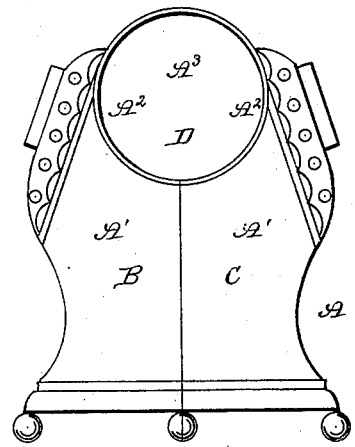
Figure 2:
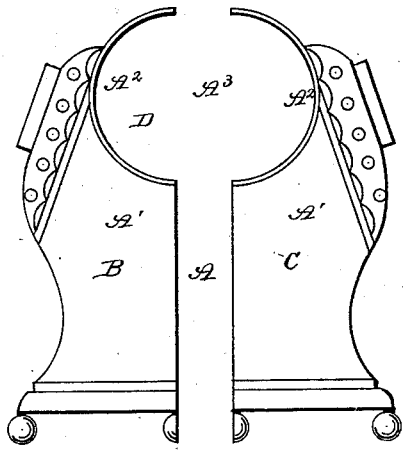
Figure 3:
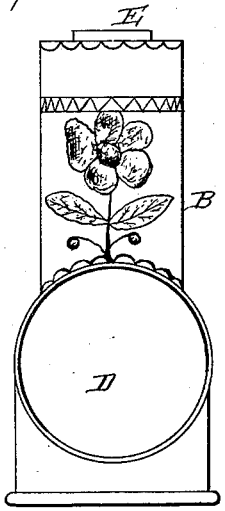
Figure 4:
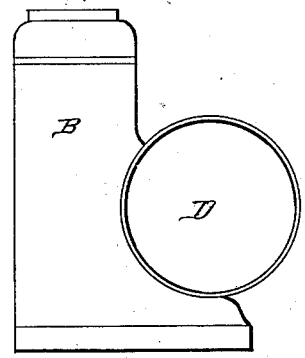

In the accompanying drawings, which fully represent my invention, Figure 1 is a side elevation of my invention. Fig. 2 is a similar view, showing the sections detached. Figs. 3 and 4 are modifications.

A represents the body of my invention, which is formed of two receptacles, B C, of any suitable shape or material, and which have secured between them the napkin-ring D. The receptacles are each provided with a perforated cap, E, through which the contents thereof may be shaken. As shown at Fig. 1, the article is composed of the two sections A', which sections are duplicates, and are each provided with a receptacle for holding pepper or salt, and the segment of an opening, A'', of suitable shape, so that when secured together in any suitable manner the napkin-ring A''' will be formed, as will be very readily understood. By this mode of constructing my invention I gain the advantage of a double use of the same mold or former.

It will be obvious that the mode of sectional construction can be advantageously applied to many other articles of table-ware aside from the specific article hereinbefore described, and I do not therefore desire to limit myself to any particular application.

Should it be desired to adapt the device for use only as a pepper or salt box, as the case may be, I would preferably make it in the form shown in Fig. 3 or 4. As at Fig. 3, the ring D is formed in the base, the box B rising above it and surmounted by the perforated cap E. When formed in this way, a good surface is secured at B for ornamentation.

In Fig. 4 the napkin-ring is placed to one side of the base, the rest of the device differing in no essential particular from the form shown in Fig. 3.

A device thus constructed will be found of great utility, can be cheaply made, and is capable of being ornamented to a very high degree.

I do not desire to limit myself to the precise forms herein shown and described, as it is obvious that many variations may be made therefrom without departing from the spirit of my invention.

Having thus described my invention, I claim—

1. A combined pepper and salt box that is formed of duplicate sections joined together in any suitable manner, substantially as shown.

2. A combined pepper and salt box and napkin-holder that is formed of duplicate sections joined together, each section having a receptacle for the condiments, and being provided with a segment of an opening, substantially as specified.

3. As a new article of manufacture, the combination of the salt-cellar, pepper-box, and napkin-ring, substantially as shown.

4. As a new article of manufacture, a salt-cellar and napkin-holder formed integrally, the salt-cellar being provided with a perforated cap, through which the contents may be shaken, substantially as described.

5. As a new article of manufacture, a salt-cellar and napkin-holder formed integrally, substantially as shown and described.

In testimony whereof I affix my signature in presence of two witnesses.

FREDERICK RATCLIFF.

Witnesses:
   GEO. H. THING,
   GARDNER T. SANFORD.